No. 684,259. Patented Oct. 8, 1901.
R. JANNEY.
VEHICLE BRAKE.
(Application filed Mar. 5, 1901.)
(No Model.)
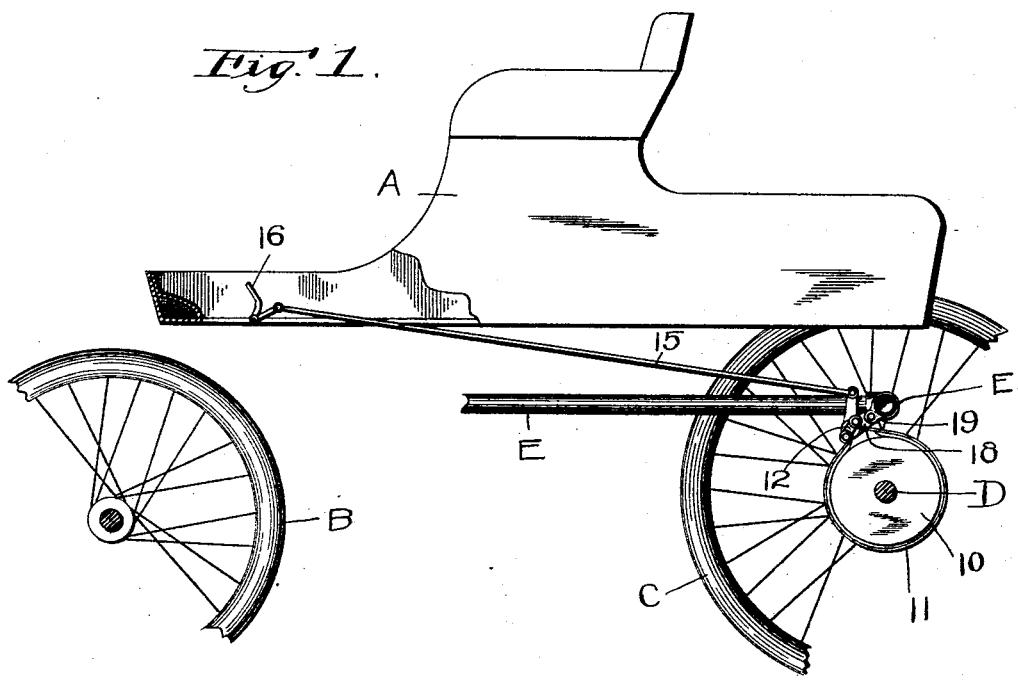
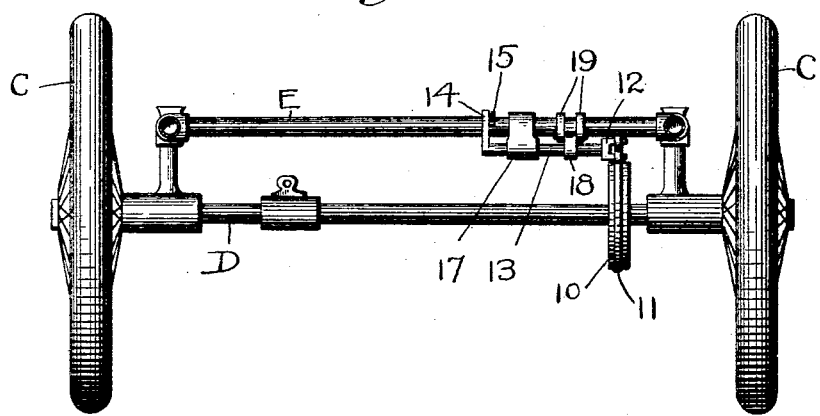

UNITED STATES PATENT OFFICE.

REYNOLD JANNEY, OF KEENE, NEW HAMPSHIRE, ASSIGNOR TO STEAMOBILE COMPANY OF AMERICA, OF SAME PLACE.

VEHICLE-BRAKE.

SPECIFICATION forming part of Letters Patent No. 684,259, dated October 8, 1901.

Application filed March 5, 1901. Serial No. 49,783. (No model.)

*To all whom it may concern:*

Be it known that I, REYNOLD JANNEY, a citizen of the United States, residing at Keene, in the county of Cheshire and State of New Hampshire, have invented a new and useful Vehicle-Brake, of which the following is a specification.

This invention relates to that class of brakes which are employed on automobiles or similar vehicles; and the especial object of this invention is to provide a construction of strap-brake which will apply pressure substantially equally around the entire periphery of a brake-disk.

To this end this invention consists of the parts and combinations of parts as hereinafter described, and more particularly pointed out in the claims at the end of this specification.

In the accompanying drawings, Figure 1 is a side view, partially broken away, of a vehicle provided with a brake constructed according to the present invention, and Fig. 2 is a transverse sectional view of the same.

In that class of brakes which are used on automobiles or similar vehicles and which employ flexible rings or brake-straps it has heretofore been customary either to secure one end of the brake-strap in fixed position, or else it has been customary to simultaneously draw both ends of the brake-strap toward each other by means of a rock-shaft or other operating connection occupying a fixed position with relation to the brake-disk. In setting or applying a strap-brake in either of these two ways it will be seen that the greatest pressure or tension will be applied to the farther side of the brake-disk and that the greatest amount of wear will, therefore, be concentrated at this point.

The especial object of my invention is, therefore, to provide a strap-brake which may be tightened equally substantially around the entire periphery of its brake-disk, so as to equalize the pressure at all points thereon. To accomplish this object, a vehicle-brake constructed according to my present invention comprises a brake-disk with a brake-strap encircling the same and an operating connection or rock-shaft which is connected to tighten the brake-strap and is mounted so that it can move toward and away from the brake-disk to permit pressure to be applied substantially equally around the entire periphery of said brake-disk.

Referring to the accompanying drawings and in detail, A designates the vehicle-body; B, one of the front wheels; C, the rear wheels; and E the supporting-frame, which is usually made out of bicycle-tubing or similar material. These parts may be of the ordinary or approved construction and need not be herein described at length. The rear wheels C are fastened on a rear axle, journaled in bearings carried by the framework E, and the rear axle may be made in sections coupled together by equalizing-gearing, and power may be applied to the rear axle in any of the ordinary manners, not necessary to herein show or describe at length.

Supported on the rear axle D is a brake-disk 10, which may be connected to or form part of the driven sprocket, which is operated from the driving-motor of the machine through a drive-chain, or said disk may form part of the equalizing-gear employed in this class of vehicles, and mounted on the brake-disk 10 is a brake-strap 11. The brake-strap 11 is connected at its ends to the studs or fingers of a fork-piece 12. The fork-piece 12 is carried by or formed integrally with an operating rock-shaft 13, and extending up from the opposite end of the rock-shaft 13 is an arm 14, connected by a link 15 to a foot-piece 16 in the ordinary manner. By means of this construction it will be seen that when the rock-shaft 13 is turned or operated the ends of the brake-strap 11 will be drawn toward or past each other, so as to tighten the brake-strap upon the brake-disk 10. Instead, however, of mounting the rock-shaft 13 in bearings which are carried with respect to the brake-disk 10, the rock-shaft is preferably mounted in bearings which permit the same to move toward and away from the brake-disk, so as to adjust itself to equalize the pressure substantially around the entire periphery of the brake-disk. As herein illustrated, one bearing or box 17 of the rock-shaft 13 may be secured rigidly to the framework E. The rock-shaft 13 fits comparatively loosely in its bearing or box 17, so as to permit a slight oscillation or swinging motion of the opposite end thereof, and the other bearing 18 of the rock-shaft is preferably pivotally connected to brackets 19 on the frame, so that by means of this construction I am enabled to apply an equal braking-pressure around substantially the entire periphery of the brake-disk 10 without concentrating the wear on the brake-strap and without the liability of the brake-strap breaking at the point of greatest pressure when a heavy braking action is necessary.

I am aware that many changes may be made in applying my brake to vehicles by those who are skilled in the art and that different constructions may be employed for providing the swinging motion of the operating rock-shaft. I do not wish, therefore, to be limited to the construction I have herein shown and described; but What I do claim, and desire to secure by Letters Patent of the United States, is—

1. The combination of a brake-disk, a brake-strap encircling the brake-disk, a rock-shaft connected to tighten the brake-strap, and means for supporting the rock-shaft so that it may be moved toward and away from the brake-disk to apply pressure equally, substantially around the entire periphery thereof, substantially as described.

2. The combination of a supporting-framework, a rear axle journaled therein, a brake-disk carried by said axle, a brake-strap encircling the brake-disk, and a rock-shaft supported by said framework so as to move toward and away from the brake-disk to apply pressure substantially equally around the entire periphery thereof, substantially as described.

3. The combination of a brake-disk, a brake-strap encircling the brake-disk, a fork-piece connected to both ends of the brake-strap, a rock-shaft carrying said piece, bearings for supporting said rock-shaft so that it may move toward and away from the brake-disk, and foot-controlled connections for operating said rock-shaft to apply pressure substantially equally around the entire periphery of the brake-disk, substantially as described.

4. In a vehicle, the combination of a framework, a rear axle, a brake-disk secured thereon, a brake-strap, a rock-shaft having a fork-piece connected to the ends of the brake-strap, and bearings for supporting the rock-shaft from the framework, one of said bearings being rigidly secured to the framework, and the other bearing being pivotally supported to permit the rock-shaft to move toward and away from the brake-disk, substantially as described.

5. In a vehicle, the combination of a rear axle, a brake-disk thereon, a brake-strap encircling said brake-disk, a rock-shaft having an operating-piece connected to the ends of the brake-strap at one end, and an upwardly-extending arm at its opposite end, bearings for said rock-shaft, one of which is secured rigidly to the frame, and the other of which is pivotally supported, a foot-piece, and a link connecting said foot-piece with the arm of the rock-shaft to apply pressure equally around substantially the entire periphery of the brake-disk, substantially as described.

In testimony whereof I have hereunto set my hand in the presence of two subscribing witnesses.

REYNOLD JANNEY.

Witnesses:
W. L. MASON,
C. L. STURTEVANT.